July 19, 1960
K. HUDSON
2,946,020
MISSING PULSE INDICATOR
Filed April 20, 1955
3 Sheets-Sheet 1
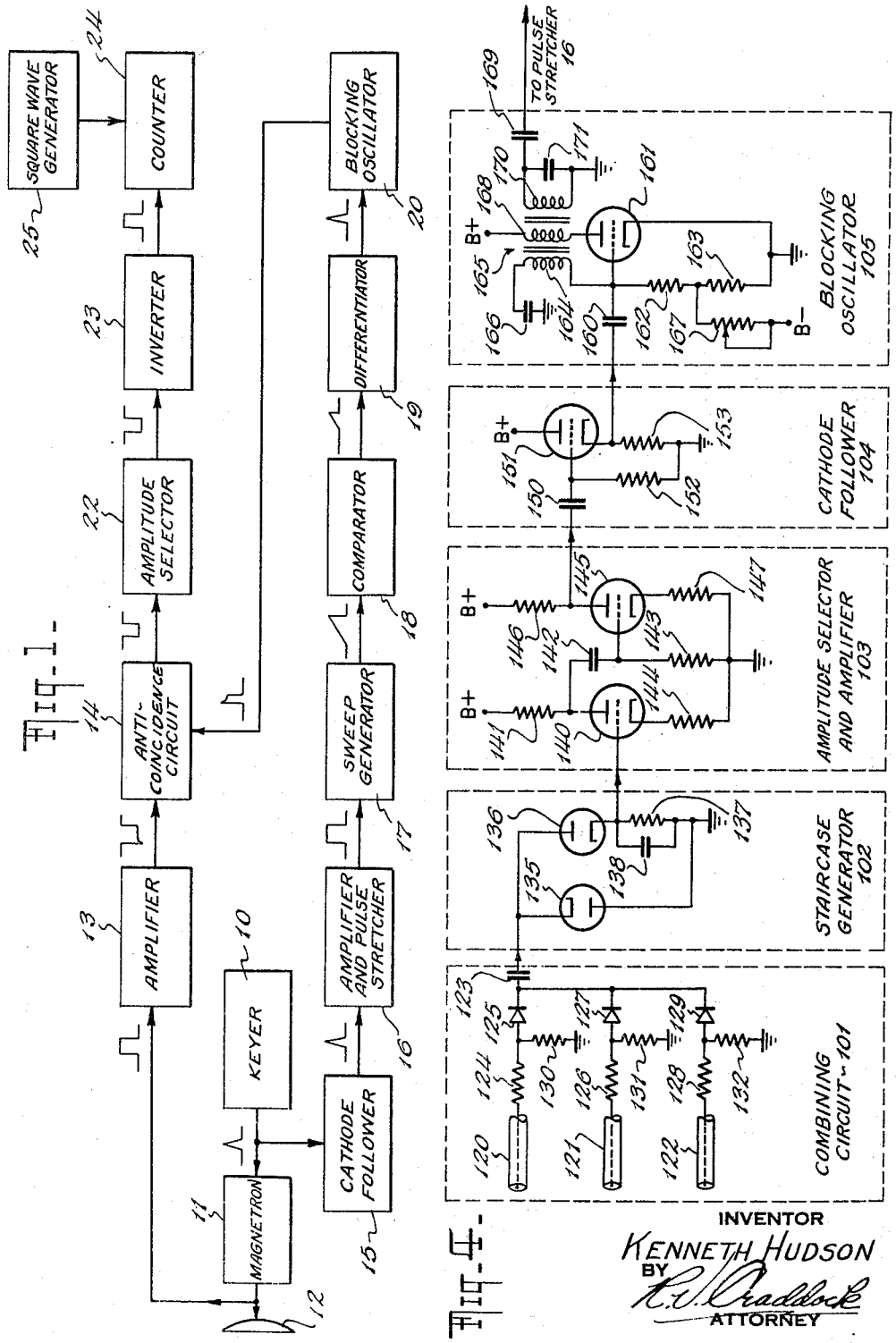
INVENTOR
KENNETH HUDSON
BY
ATTORNEY

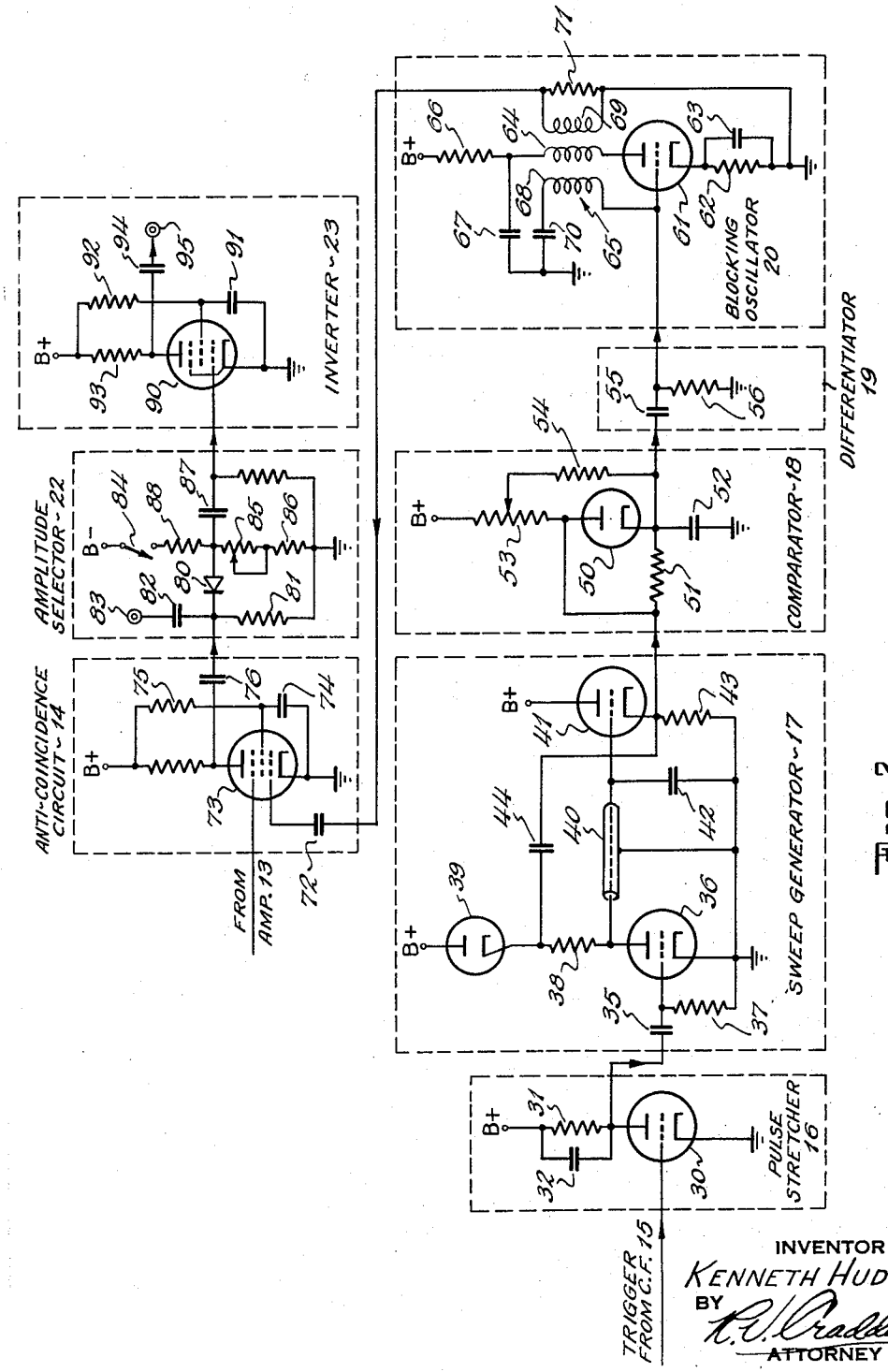

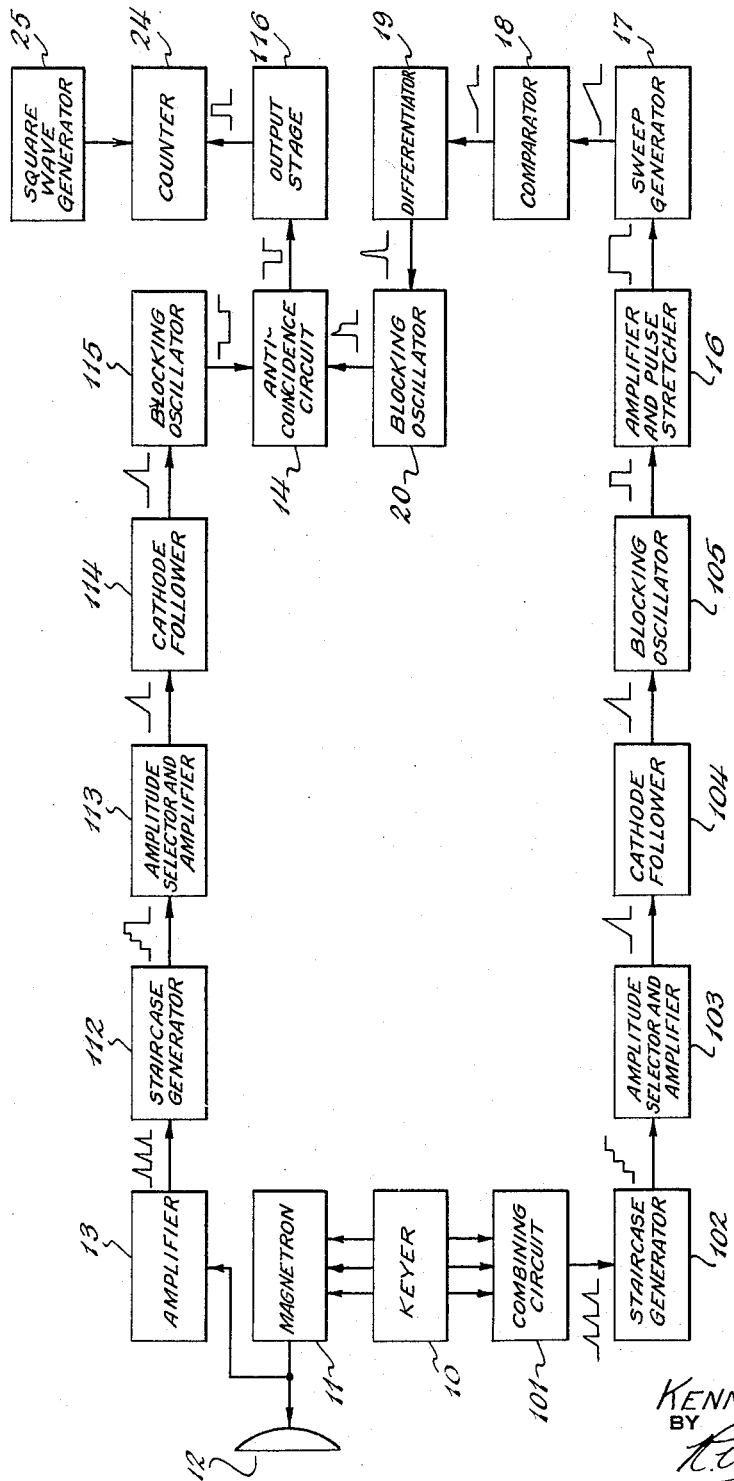

United States Patent Office 2,946,020
Patented July 19, 1960

2,946,020

MISSING PULSE INDICATOR

Kenneth Hudson, Plainview, N.Y., assignor to Sperry Rand Corporation, a corporation of Delaware Filed Apr. 20, 1955, Ser. No. 502,603

7 Claims. (Cl. 331—44)

This invention relates to a circuit for indicating the omission of a pulse from a series or group.

In many electrical systems a power, or oscillator, tube such as a magnetron is triggered into operation intermittently by a series of trigger pulses from a trigger tube such as a thyratron. The magnetron may have a duty cycle having a duration in the order of magnitude of one microsecond, and may be in its quiescent state for a duration in the order of magnitude of 500 microseconds. In an operating system it may be known from the general operation of the system that the magnetron is not operating each time it is triggered. However, due to the shortness of the duty cycle, its rapid recurrence and the persistence in the system indicator, which may be a cathode ray tube, it may be difficult to accurately determine just when and how often the magnetron misfires. This information is important in evaluating the operation of the system and in discovering and eliminating the causes of misfire.

If the electrical system produces, instead of a series of single pulses, a series of groups of pulses, which groups may be coded, the utilizing apparatus will respond only when all of the pulses are present. In such case, it becomes important to know how many groups are lacking one or more pulses, and this information is more to be desired than the total number of missing pulses since one missing pulse in a group has the same result as the omission of an entire group.

It is desirable that any misfire counting device have simplicity of operation so that precision adjustments are not required by a skilled operator and so that satisfactory operation can be achieved in spite of delays which are inherent in the system and caused by the connecting circuits. The magnetron has a delay between its triggering and firing.

It is an object of this invention to provide a magnetron misfire counting circuit.

It is an object of this invention to provide a circuit which will produce an output pulse each time a magnetron pulse does not appear for its respective triggering pulse.

It is an object of this invention to produce a circuit with two inputs and an output which will produce an output pulse when an input pulse is applied to a certain one of said inputs and not at the other.

It is an object of this invention to provide a circuit which will produce one output pulse for each group of input pulses having one or more missing pulses.

It is an object of this invention provide a circuit which will give an output pulse for each group of trigger pulses which does not produce an exactly corresponding number of resulting groups.

These and other objects are achieved by this invention as herein described which utilizes an anti-coincidence circuit. The trigger pulses are applied to one input of the anti-coincidence circuit in a positive sense and the magnetron pulses are applied to another input of the anti-coincidence circuit in a negative sense. The application of a positive trigger pulse in the absence of the simultaneous application of a negative magnetron pulse will result in an output pulse to be counted. The negative magnetron pulse, which cannot cause an output pulse, is advantageously made of greater duration than the trigger pulse so that it is easier to align the pulses in operation. Means are also provided to adjustably delay the trigger pulse to achieve synchronization with a corresponding magnetron pulse in spite of inherent delays in the circuit, especially in the connecting cables.

When groups lacking pulses are to be counted, both the triggering groups and the magnetron groups are applied to respective stair-case generators which produce pulses having an amplitude commensurate with the number of pulses in a group. Each of these last-mentioned pulses are applied to amplitude selector circuits which produce an output only when the stair-case pulses are of an amplitude indicating full groups. The outputs of the amplitude selector circuits are applied to the anti-coincidence circuit.

Other advantages will be apparent to those skilled in the art from a consideration of the following specification considered with the accompanying drawings in which, Fig. 1 is a block diagram of a circuit for counting the number of missing pulses;

Fig. 2 is a schematic diagram of some of the components shown in Fig. 1;

Fig. 3 is a block diagram of a circuit for counting the number of pulse groups lacking the predetermined number of pulses; and Fig. 4 is a schematic diagram of some of the components shown in Fig. 3.

In the embodiment of this invention shown in Fig. 1, a keyer 10 produces a series of trigger pulses which are applied to magnetron 11 which should produce a high-power, high-frequency radio pulse during the application of each trigger pulse. The magnetron pulses are fed to antenna, or dummy load 12, but a small portion of the magnetron pulses are applied to amplifier 13. The output of amplifier 13 is applied to one input of anti-coincidence circuit 14. Circuit 14 has two inputs and an output and is so arranged that if a positive pulse is applied to one of its inputs without the simultaneous application of a negative pulse from amplifier 13 to the other of its inputs, a pulse will be produced at its output. However, the application of a negative pulse from amplifier 13 without any pulse applied to its other input will not result in any output.

The trigger pulses from keyer 10 are also applied through a cathode follower stage 15 and through amplifier and pulse stretcher circuit 16 to the sweep generator 17. Circuit 16 amplifies the trigger pulses applied thereto and increases their duration before they are applied to sweep generator 17. Sweep generator 17 beings a highly linear sawtooth wave upon the application thereto of each trigger pulse from component 16 and applies the sawtooth wave to comparator 18. Comparator 18 produces a pulse when the sawtooth wave from component 17 attains a certain predetermined voltage level. The output of comparator 18 is applied to differentiator 19, which produces a sharply rising pulse, in response to the gently rising pulse from comparator 18, and applies said sharply rising pulse to blocking oscillator 20. Blocking oscillator 20 produces a pulse upon the application of each pulse from differentiator 19 and applies it to one input of anti-coincidence circuit 14.

The output of anti-coincidence circuit 14 is applied to amplitude selector circuit 22 which is arranged to provide an output pulse whenever the applied input pulse is above a certain preselected amplitude. The output of circuit 22 is applied through inverter stage 23 to counter 24. Counter 24 may be any of the commercially available counter circuits which will count and indicate an accumulated total of applied pulses over a certain period through which it is enabled. In Fig. 1, counter 24 is enabled by square wave generator 25 which periodically turns counter 24 on and off to show accumulated totals of magnetron misfires over certain predetermined periods.

Components 16, 17, 18, 19, 20, 14, 22 and 23 are shown schematically in Fig. 2. Pulse stretcher 16 includes a triode 30, the grid of which is connected to the output from the cathode follower 15 and the plate of which is connected to a source of positive potential through resistor 31 which is shunted by condenser 32.

The plate of triode 30 is connected through coupling condenser 35 to the grid of triode 36 in sweep generator 17. The grid of triode 36 is also connected to ground through resistor 37. The plate of triode 36 is connected to one end of resistor 38, the other end of which is connected to the cathode of diode 39, the plate of which is connected to a source of positive potential. The plate of triode 36 is connected through a connection including a piece of coaxial line 40 to the grid of triode 41. The plate of triode 41 is connected to a source of positive potential. The grid and cathode of triode 41 are respectively connected to ground through condenser 42 and resistor 43. The cathode of diode 39 is connected to the cathode of triode 41 through condenser 44.

The cathode of triode 41 is connected to the plate of diode 50 in the comparator circuit 18 and to the cathode of diode 50 through resistor 51. The cathode of diode 50 is connected through condenser 52 to ground. The plate of diode 50 is connected through potentiometer 53 to a source of positive potential. The adjustable contact of potentiometer 53 is connected to one terminal of condenser 55 in differentiating circuit 19. The other terminal of condenser 55 is connected to ground through resistor 56 and to the grid of triode 61 in blocking oscillator 20.

The cathode of triode 61 is connected to ground through resistor 62 which is shunted by condenser 63. The plate of triode 61 is connected to one end of winding 64 of transformer 65. The other end of winding 64 is connected through resistor 66 to a source of positive potential. The junction of winding 64 and resistor 66 is connected through condenser 67 to ground. Transformer 65 also has two other windings 68 and 69. The grid of triode 61 is connected through winding 68 and then through condenser 70 to ground. Winding 69 is shunted by a resistor 71 and has one end connected to ground and the other connected through condenser 72 to the first control grid of pentode 73 in anti-coincidence circuit 14.

The screen grid of pentode 73 is connected through condenser 74 to ground and through resistor 75 to a source of positive potential. The suppressor grid of pentode 73 is connected to a source of magnetron pulses, the output of amplifier 13. The plate of pentode 73 is connected through condenser 76 to the negative terminal (cathode) of crystal diode 80, which is also connected to ground through resistor 81 and through condenser 82 to negative output terminal 83. The positive terminal (anode) of diode 80 is connected through resistor 88 and switch 84 to a source of negative potential. The positive terminal of diode 80 is also connected through variable resistor 85 and fixed resistor 86 to ground. The positive terminal of diode 80 is also connected through condenser 87 to the control grid of pentode 90 in inverter stage 23. The screen grid of pentode 90 is connected through condenser 91 to ground and through resistor 92 to a source of positive potential. The suppressor grid of pentode 90 is connected to ground. The plate of pentode 90 is connected through resistor 93 to a source of positive potential and is also connected through condenser 94 to positive output terminal 95.

In the operation of the embodiment of this invention shown in Figs. 1 and 2, the trigger pulses from keyer 10 are applied through cathode follower 15, which is an isolating stage, to amplifier and pulse stretcher 16, the details of which are seen in Fig. 2. The trigger pulse applied to the grid of triode 30 in pulse stretcher 16 causes that tube to conduct and charge condenser 32. Condenser 32 and its shunt resistor 31 have such a time constant that the pulse applied from the plate of triode 30 through condenser 35 to the grid of triode 36 in sweep generator 17 is sufficient to cut off tube 36 for six to ten microseconds. The non-conduction of triode 36 permits condenser 42 to charge through resistor 38 and diode 39. To obtain a more linear sweep, the charge at the positive terminal of condenser 42 is applied to the grid of cathode follower tube 41. The rising voltage across condenser 42, as it charges, causes triode 41 to conduct increasingly with time causing a rising voltage to appear at the cathode of triode 41. This rising voltage is applied through condenser 44, which is of a relatively large size, to the junction of resistor 38 and the cathode of diode 39. This arrangement supplies an ever-increasing voltage to charge condenser 42 and causes the sweep to have a highly linear characteristic. Diode 39 serves to set the initial sweep voltage at the supply end of charging resistor 38 at substantially the potential of the positive source. The short piece of coaxial line 40 is selected to have such a negative temperature coefficient that it counteracts the positive temperature coefficient of condenser 42 and thus makes the linear sweep independent of the ambient temperature.

The rising sweep voltage appearing at the cathode of triode 41 in sweep generator 17 is applied directly to the plate of diode 50. The bias across diode 50 is set by potentiometer 53. When the rising sweep voltage applied to the plate of diode 50 overcomes the bias, diode 50 will conduct, initiating a pulse which is applied to differentiating circuit 19. The adjustment of potentiometer 53 thus determines the time delay between the leading edge of the trigger pulse applied to the pulse stretcher 16 and the leading edge of the pulse in the output of comparator 18. Differentiating circuit 19, which consists of condenser 55 and resistor 56, differentiates the pulse produced by comparator 18 and applies the differentiated pulse with a sharply rising leading edge to the grid of tube 61 in blocking oscillator 20. The elements of blocking oscillator 20 operate in a conventional manner to generate a generally rectangular pulse of predetermined duration which is applied through condenser 72 to the control grid of pentode 73 in coincidence circuit 14.

The magnetron pulse applied to the antenna 12 is also applied, in a highly attenuated form, to the amplifier 13 which suitably amplifies the pulse and applies it to the suppressor grid of pentode 73. Since the trigger pulse initiates the magnetron pulse, the situation will not occur where there is a magnetron pulse without a trigger pulse. However, it is entirely possible that the magnetron will misfire and not produce a pulse upon being triggered. If the magnetron pulse and the trigger pulse both appear, the magnetron pulse will drive the suppressor grid of tube 73 sufficiently negative so that tube 73 will not conduct, in spite of the positive trigger pulse being applied to the control grid. However, if the magnetron misfires and only the trigger pulse is applied to the input of tube 73, a negative pulse will appear at the plate of tube 73. Since a magnetron pulse applied to the input of tube 73 is negative, it cannot cause that tube to conduct. It is therefore preferred to have the magnetron pulse of longer duration than the trigger pulse to give some tolerance in aligning the occurrence of the two pulses at the tube 73.

The jack 83 shown in amplitude selector circuit 22 may be used to provide a negative pulse for counters intended to operate on an input of negative pulses. Circuit 22 consists mainly of an adjustably biased crystal diode 80 which will not conduct until a negative pulse of at least a predetermined amplitude is applied. This amplitude selector circuit isolates the counter from low amplitude noise which might otherwise cause the counter to operate. Moreover, since partial misfires may cause a low amplitude pulse to be produced in the output of the anti-coincidence circuit 13, the adjustable resistor 85 permits a predetermination of the degree of magnetron malfunction which will be counted as a misfire. Switch 84 is provided to allow removal of the negative bias from diode 80 and thus allow all pulses, if that is desired, to be applied to the counter 24. Inverter stage 23 is employed to invert the negative pulse produced in the output of the anti-coincidence circuit 14 to a positive pulse for use with counters designed to operate with such an input.

Square wave generator 25 generates a square wave and enables counter 24 for predetermined periods of time, which might be in the order of magnitude of five minutes, to give an accumulated total of misfires during that period.

The embodiment of this invention shown in Fig. 3 of the drawing is intended for use with a system in which the magnetron produces a series of recurrent groups of coded pulses. The embodiment of Fig. 3 counts the number of groups which do not have their full quota of pulses. In Fig. 3 components 10–14, 16–20, 24 and 25, are the same in construction as the components having the corresponding names and reference numerals already described in Fig. 1. In Fig. 3 the keyer 10 supplies a group of keying pulses, three for the purposes of this illustration, to the magnetron 11, which is thereby energized to supply a corresponding group of high power, high frequency radio pulses to antenna 12.

The pulses from keyer 10 are also supplied through combining circuit 101 which combines the three pulses, supplied by three connections, to a group supplied to the staircase generator 102 by one wire. Staircase generator 102 integrates the three pulses supplied at its input to produce a staircase wave having one step for each pulse.

The staircase output of generator 102 is then applied to amplitude selector and amplifier circuit 103 which produces a pulse at its output only if the staircase wave has the number of steps corresponding to the predetermined number of pulses in the group. The output pulse produced by component 103 is supplied through cathode follower stage 104 and through blocking oscillator 105 to amplifier pulse stretcher 16 which is connected in succession to sweep generator 17, compartor 18, differentiator 19 and blocking oscillator 20, the output of which is applied to one input of anti-coincidence circuit 14.

A small portion of the output of magnetron 11 is applied through amplifier 13 to staircase generator 112, the output of which is applied to amplitude selector and amplifier circuit 113. The detailed circuits of components 112 and 113 are the same as the circuits in components 102 and 103 and will be described in detail below. The pulse produced at the output of component 113 is applied through cathode follower stage 114 to blocking oscillator 115, the output of which is applied to the other input of anti-coincidence circuit 14. The output of anti-coincidence circuit 14 is applied through output stage 116 to counter 24 which is controlled by square wave generator 25.

Reference is now made to Fig. 4 in which are shown in detail, schematic circuits of components 101–105. In component 103, the three inputs from keyer 10 are indicated as coaxial lines 120, 121 and 122. These are respectively connected to condenser 123 through series resistor-diode combinations 124—125, 126—127, 128—129 and the junctions of these resistor-diode combinations are respectively connected to ground by resistors 130, 131 and 132. Diodes 125, 127 and 129 may be crystal diodes. The other terminal of condenser 123 is connected to the cathode of diode 135 and to the plate of diode 136 in staircase generator 102. The plate of diode 135 is directly connected to ground. The cathode of diode 136 is connected through resistor 137 and condenser 138, connected in parallel, to ground.

The cathode of diode 136 is directly connected to the grid of triode 140 in amplitude selector and amplifier circuit 103. The plate of triode 140 is connected through resistor 141 to a source of positive potential and through condenser 142 and resistor 143, connected in series, to ground. Cathode of triode 140 is connected through resistor 144 to ground. The junction of condenser 142 and resistor 143 is connected to the grid of triode 145 also in component 103. The plate of triode 145 is connected through resistor 146 to a source of positive potential. The cathode of triode 145 is connected through resistor 147 to ground. The plate of triode 145 is also connected through condenser 150 to the grid of triode 151 in cathode follower stage 104. The grid of triode 151 is connected to ground through resistor 152, and the cathode of triode 151 is connected to ground through resistor 153. The cathode of triode 151 is also connected through condenser 160 to the grid of triode 161 in blocking oscillator 105. The plate of triode 151 is connected to a source of positive potential.

The grid of triode 161 is connected through resistors 162 and 163 connected in series to ground. The junction of resistors 162 and 163 is connected through variable resistor 167 to a source of negative potential. The grid of triode 161 is also connected through winding 164 of transformer 165 and condenser 166 to ground. The cathode of triode 161 is directly connected to ground. The plate of triode 161 is connected through winding 168 of transformer 165 to a source of positive potential. The output of blocking oscillator 105 is derived through condenser 169 from one end of a third winding 170 of transformer 165. The other end of winding 170 is connected to ground. Condenser 171 is connected in shunt across winding 170.

In the operation of the device shown in Figs. 3 and 4, keyer 10 supplies a recurrent series of groups of pulses to operate magnetron 11. In response to each group of trigger pulses, magnetron 11 produces a group of radio frequency pulses which are radiated by antenna 12. The trigger pulses from keyer 10 are also supplied to combining circuit 101 shown in detail in Fig. 4. Diodes 125, 127 and 129 and their associated circuits are for the purpose of preventing spurious negative pulses from being applied through the trigger channel. Positive trigger pulses applied through condenser 123 to diode 136 cause that tube to conduct and apply a charge across condenser 138. Each succeeding pulse in a group adds to the charge across condenser 138 to give a staircase wave having one step for each pulse of the group. Resistor 137 allows condenser 138 to discharge during the interval between groups. Diode 135 is for the purpose of grounding negative pulses appearing at the input of staircase generator 102, thus helping to eliminate spurious negative pulses and keeping the condenser 123 properly discharged.

Due to limitations in the deionizing time in thyratron trigger tubes, it is often necessary to employ in keyer 10 one thyratron for each pulse of a group. However, if thyratrons are available which will key at the pulse repetition rate of a group, it will be necessary to use only one pulsing thyratron in keyer 10 and have only one connection to the magnetron 11. In this case there would be one connection between keyer 10 and staircase generator 102, eliminating the necessity for combining circuit 101.

Triode 140 in amplitude selector and amplifier 103 is normally non-conducting while triode 145 is normally conducting. When the staircase wave applied to the grid of triode 140 attains sufficient amplitude (i.e. has a step for each of the predetermined number of pulses in a group), tube 140 will suddenly conduct and will apply through condenser 142 a negative pulse to the grid of triode 145 which will immediately cease to conduct. This applies a positive pulse through condenser 150 to the grid of cathode follower tube 151 which in turn applies a positive pulse through condenser 160 to the grid of blocking oscillator 105.

Blocking oscillator 105 operates in a conventional manner, well known to those skilled in the art. Variable resistor 167 is provided to allow a selection of the amplitude of applied pulses that will trigger blocking oscillator 105 into supplying a rectangular pulse to amplifier and pulse stretcher 16.

Components 16, 17, 18, 19 and 20 operate in the same manner described above for these components with respect to Figs. 1 and 2, to delay and shape the trigger pulse and apply it to the anti-coincidence circuit 14.

The radio frequency pulses produced by magnetron 11 are applied through amplifier 13 to staircase generator 112 and amplitude selector and amplifier 113. Components 112 and 113 function exactly as described above for components 102 and 104. The output of component 113 is applied through cathode follower stage 114, an isolating stage, to blocking oscillator 115 which generates a negative rectangular pulse of the amplitude and shape desired and applies it to anti-coincidence circuit 14. As in Figs. 1 and 2, it is preferred to have the magnetron pulse of greater duration than the trigger pulse as these pulses are applied to anti-coincidence circuit 14.

Anti-coincidence circuit 14 of Fig. 3 operates in the same manner described for component 14 in Figs. 1 and 2. Its output, a negative pulse, is applied through output stage 116 which is a power amplifier, the output of which is applied to counter 24. Counter 24 and its controlling square wave generator 25 operate as described above for Figs. 1 and 2.

It will be seen that this invention provides a missing pulse, or misfire, counter, which is easy to adjust for operation because of the greater relative duration of the magnetron pulse applied to the anti-coincidence circuit. This invention also includes an easily adjusted precision delay allowing any pulse of a group to be studied for misfire by the circuit of Fig. 1 while the circuit of Fig. 3 allows the counting of groups having any missing pulses. Moreover, the circuits herein disclosed will operate satisfactorily although the pulse supplied to the anti-coincidence circuits 14, as by the blocking oscillators 20 and 115, deviate substantially from a rectangular shape.

It will be understood that this invention is advantageous not only in counting missing magnetron pulses, but also in counting any missing pulses of any series that result from initiating pulses. The circuits herein disclosed may be used in detecting and counting misfires in the thyratron or in the tubes of the circuits preceding the thyratron.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A circuit for indicating each time a group of pulses of an initiating series, each group of which has a common predetermined number of pulses, does not initiate a resulting group of pulses having a resulting pulse for each initiating pulse, including a first means to which is applied said initiating series of pulses and which produces at its output a pulse for each applied group having the predetermined number of pulses, second means to which is applied the resulting series of pulses and which produces at its output a pulse for each applied group having a predetermined number of pulses, an anti-coincidence circuit connected to the outputs of said first and second means and which produces a pulse at its output only when an output pulse from said second means is applied thereto without the simultaneous application of an output pulse from said first means.

2. The combination of claim 1 in which the output pulse from said first means is delayed with respect to the last pulse of a group of said initiating series.

3. The combination of claim 1 in which the pulses produced at the output of said second means are of greater duration than the pulses produced at the output of said first means.

4. The combination of claim 1 in which each of said first and second means comprises a circuit producing at its output a pulse for each applied group of pulses, said last mentioned output pulse being commensurate in amplitude with a number of pulses in the corresponding applied group, the output of said circuit being connected to an amplitude selector circuit which will produce at its output a pulse only when the pulse applied to its input has an amplitude indicative of the predetermined number of pulses in a group.

5. The combination of claim 4 in which the output of said first means is delayed.

6. The combination of claim 4 in which the pulses produced at the output of said second means are of longer duration than the pulses produced at the output of said first means.

7. In a system for indicating when a magnetron misfires, the combination including means for providing a series of trigger pulses to trigger the magnetron and thereby produce a series of magnetron output pulses, an anti-coincidence circuit having two input terminals and one output terminal, means for applying to the first of said input terminals a version of said magnetron pulses, said version being of a first polarity, variable delay means coupled to said trigger means for providing a delayed version of said trigger pulses, said last-named means including sweep voltage generating means, voltage comparator means, and a pulse generating means responsive to said comparator means for generating pulses of lesser time duration than said version of magnetron pulses, means for coupling the delayed version of said trigger pulses to the second input terminal of the anti-coincidence means, said delayed version of trigger pulses being of the opposite polarity to the version of magnetron output pulses, said anti-coincidence circuit producing an output pulse only when a pulse from said delayed version of pulses is applied thereto without the simultaneous application thereto of a pulse from said version of magnetron output pulses, and counting means coupled to the anti-coincidence circuit for counting the number of pulses produced thereby.

References Cited in the file of this patent

UNITED STATES PATENTS

| | | |
|---|---|---|
| 2,641,696 | Woolard | June 9, 1953 |
| 2,651,753 | Buyer | Sept. 8, 1953 |
| 2,682,573 | Hunt | June 29, 1954 |
| 2,691,098 | Selove | Oct. 5, 1954 |
| 2,785,305 | Crooks et al. | Mar. 12, 1957 |
| 2,789,267 | Beal et al. | Apr. 16, 1957 |
| 2,790,142 | Guthrie | Apr. 23, 1957 |
| 2,895,107 | Klein | July 14, 1959 |